United States Patent
Karray et al.

(10) Patent No.: US 8,782,171 B2
(45) Date of Patent: Jul. 15, 2014

(54) VOICE-ENABLED WEB PORTAL SYSTEM

(75) Inventors: Fakhreddine Karray, Waterloo (CA); Jiping Sun, Waterloo (CA)

(73) Assignee: Voice Enabling Systems Technology Inc., Waterloo (CA)

(*) Notice: Subject to any disclaimer, the term of this patent is extended or adjusted under 35 U.S.C. 154(b) by 0 days.

(21) Appl. No.: 12/176,711

(22) Filed: Jul. 21, 2008

(65) Prior Publication Data

US 2009/0024720 A1 Jan. 22, 2009

Related U.S. Application Data

(60) Provisional application No. 60/951,032, filed on Jul. 20, 2007.

(51) Int. Cl.
*G06F 15/16* (2006.01)

(52) U.S. Cl.
USPC .............. 709/219; 379/88.13; 379/88.16; 379/88.18; 704/4.9

(58) Field of Classification Search
USPC ........ 379/88.1, 88.13, 88.16, 88.03; 707/514; 455/412.2; 704/4, 235, 270.1, 252, 9, 704/277; 709/203
See application file for complete search history.

(56) References Cited

U.S. PATENT DOCUMENTS

| | | | | |
|---|---|---|---|---|
| 6,529,586 B1* | 3/2003 | Elvins et al. | ............... | 379/88.13 |
| 6,658,414 B2* | 12/2003 | Bryan et al. | ............... | 379/88.01 |
| 6,704,708 B1* | 3/2004 | Pickering | ............... | 704/235 |
| 6,842,767 B1* | 1/2005 | Partovi et al. | ............... | 709/203 |
| 6,999,930 B1* | 2/2006 | Roberts et al. | ............... | 704/270.1 |
| 6,999,932 B1* | 2/2006 | Zhou | ............... | 704/277 |
| 7,242,751 B2* | 7/2007 | Bushey et al. | ............... | 379/88.03 |
| 7,720,682 B2* | 5/2010 | Stephanick et al. | ............... | 704/252 |
| 7,844,458 B2* | 11/2010 | Hirota et al. | ............... | 704/252 |
| 2002/0010715 A1* | 1/2002 | Chinn et al. | ............... | 707/514 |
| 2004/0087300 A1* | 5/2004 | Lewis | ............... | 455/412.2 |
| 2005/0033582 A1* | 2/2005 | Gadd et al. | ............... | 704/277 |
| 2005/0043940 A1* | 2/2005 | Elder | ............... | 704/9 |
| 2008/0159491 A1* | 7/2008 | Kelley et al. | ............... | 379/88.16 |
| 2010/0082327 A1* | 4/2010 | Rogers et al. | ............... | 704/4 |

* cited by examiner

*Primary Examiner* — Dustin Nguyen
(74) *Attorney, Agent, or Firm* — Carlson, Gaskey & Olds P.C.

(57) ABSTRACT

A voice-enabled web portal system includes a web portal server and a call manager software module. The web portal server is operable to download data according to parameters of a web portal. The call manager software module is operable to accept a voice query from a user via telephone, to retrieve a portion of the downloaded data in response to the voice query, and to provide the portion of downloaded data to the user via telephone. A method of providing information from a web portal includes downloading data via a web portal according to parameters of the web portal at a predetermined time interval, filtering the downloaded data to produce portal information, and selectively providing portions of the portal information in response to a voice query.

19 Claims, 4 Drawing Sheets

VOICE-ENABLED WEB PORTAL SYSTEM

The application claims priority to U.S. Provisional Application No. 60/951,032 which was filed on Jul. 20, 2007.

BACKGROUND OF THE INVENTION

This application relates to a web portal, and more particularly to a voice-enabled web portal system.

Recently personal web portals, such as MyYahoo and iGoogle, have become increasingly popular. These portals enable a user to enter data, such as the user's geographic location and interests, and to have the web portal retrieve information related to those interests and/or to that location. These portals enable users to quickly gather desired data through the portal instead of individually accessing a variety of sources to gain the desired information. Some of the retrieved information comes from really simple syndication ("RSS") feeds. However, browsing the Internet through a mobile device to access a web portal can be cumbersome. Also, if one is unable to access their computer that person is unable to access their personal web portal.

SUMMARY OF THE INVENTION

A voice-enabled web portal system includes a web portal server and a call manager software module. The web portal server is operable to download data according to parameters of a web portal. The call manager software module is operable to accept a voice query from a user via telephone, to retrieve a portion of the downloaded data in response to the voice query, and to provide the portion of downloaded data to the user via telephone.

A method of providing information from a web portal includes downloading data via a web portal according to parameters of the web portal at a predetermined time interval, filtering the downloaded data to produce portal information, and selectively providing portions of the portal information in response to a voice query.

These and other features of the present invention can be best understood from the following specification and drawings, the following of which is a brief description.

DETAILED DESCRIPTION OF THE PREFERRED EMBODIMENT

Figure 1:
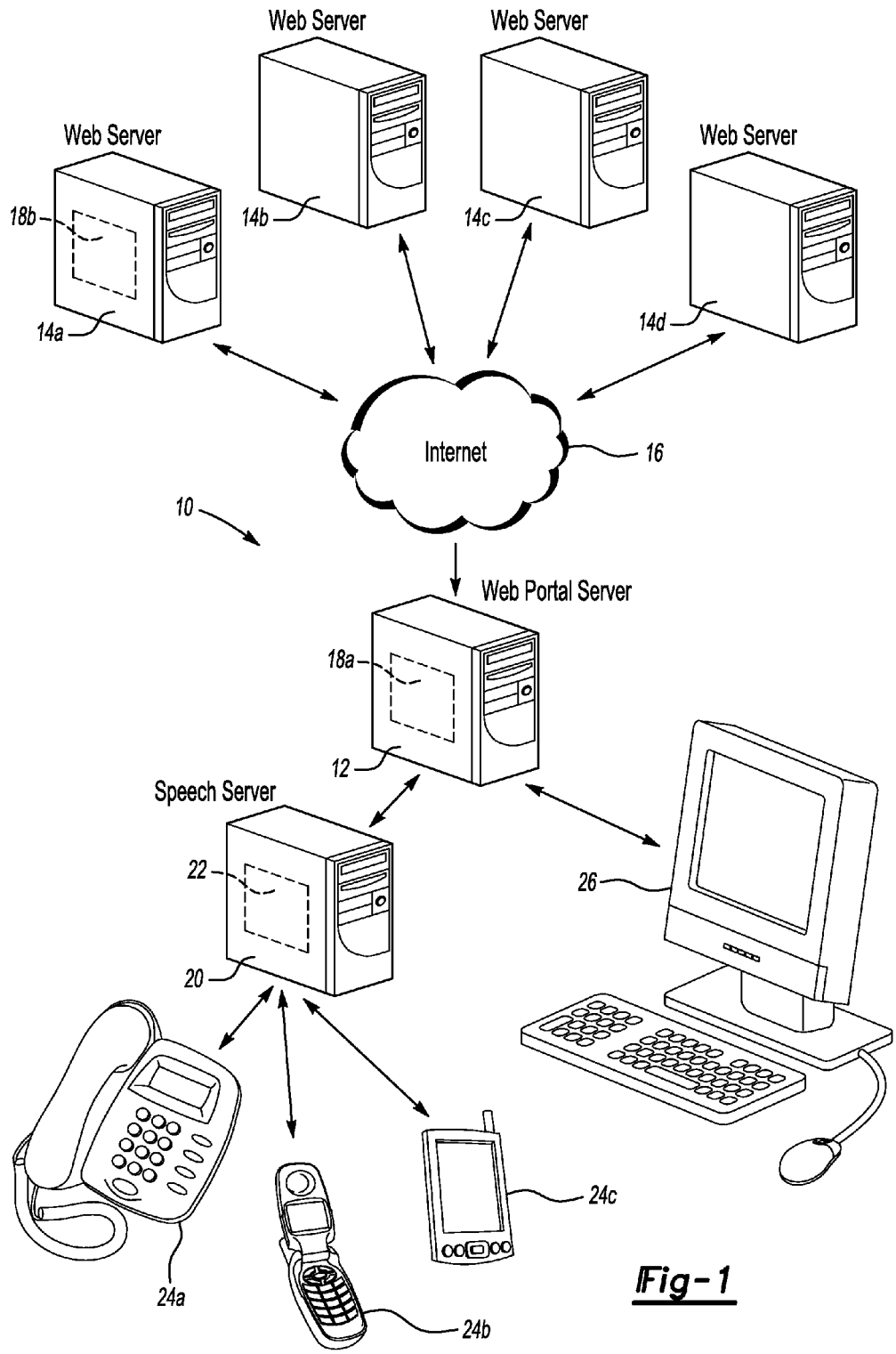
FIG. 1 schematically illustrates a voice-enabled web portal system.

FIG. 1 schematically illustrates a voice-enabled web portal system 10. A web portal server 12 is operable to download information via a web portal 18 from a plurality of web servers 14a-d through the Internet 16. The web portal 18a may reside on the web portal server, may be a third party web portal 18b such as MyYahoo or iGoogle that resides on one of the web servers 14a-d, or may reside at another location. The web portal 18 includes parameters defining a desired data set. Some example parameters include a user's geographic location (e.g. Detroit, Mich.), or a user's interests (e.g. news, sports, entertainment, etc.).

A speech server 20 includes a call manager 22 and is operable to accept a voice query from a user via telephone 24, such as a landline phone 24a, a cell phone 24b, or a personal digital assistant ("PDA") 24c. The speech server 20 is also operable to retrieve data from the web portal 18 and to provide that data to a user via telephone 24a-c. However, it is understood that a user could also use a computer 26 to directly interact with the web portal 18 without using the speech server 20. Also, if the PDA 24c had Internet access, a user could use that Internet functionality to bypass the speech server 20 and to directly query the web portal 18. Although the web portal server 12 and speech server 20 are shown as separate components, it is understood that they could reside on the same server.

Figure 2:
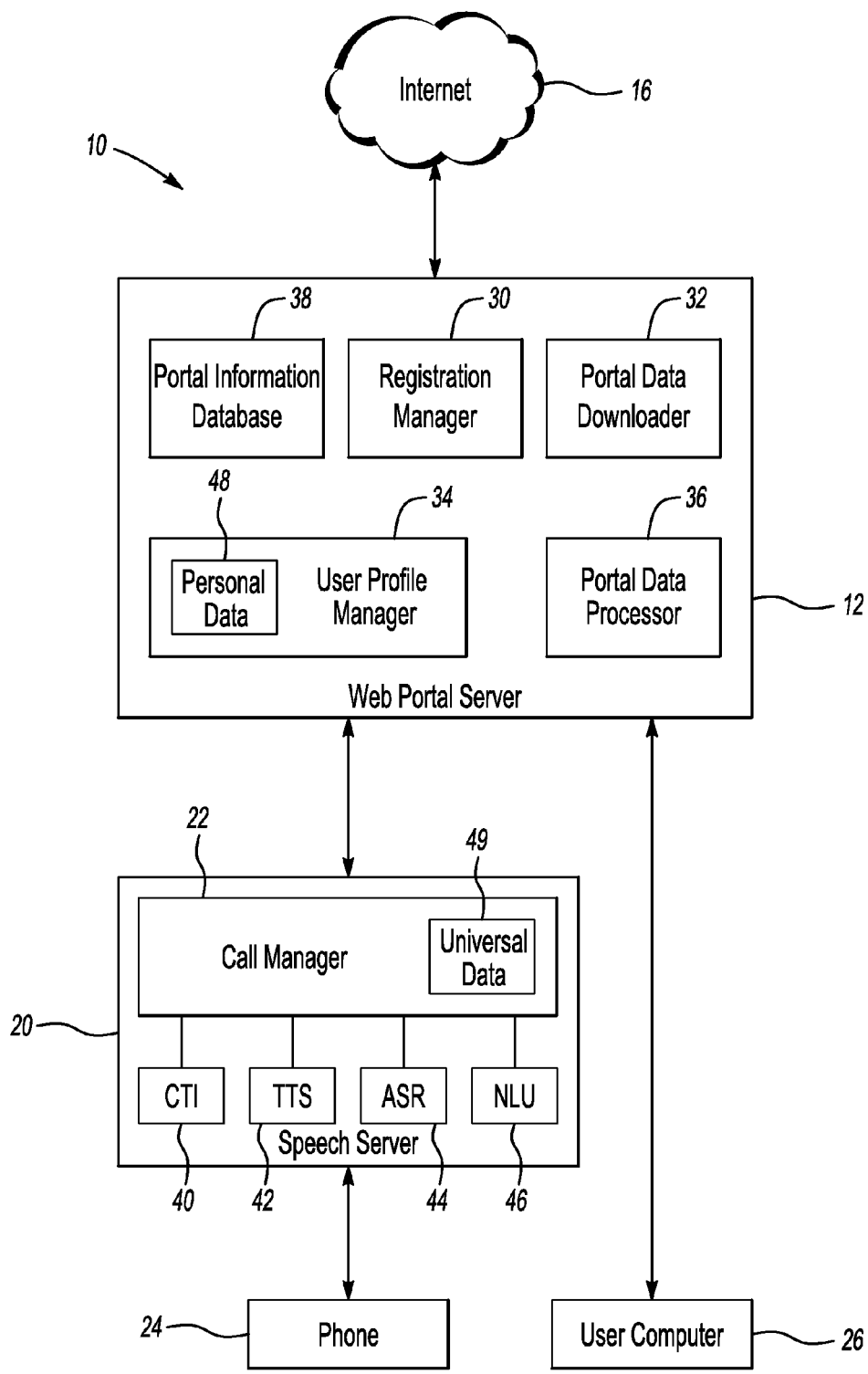
FIG. 2 schematically illustrates the web portal system of FIG. 1 in greater detail.

FIG. 2 schematically illustrates the web portal system 10 of FIG. 1 in greater detail. The web portal server 12 includes a registration manager 30, a portal data downloader 32, a user profile manager 34, and a portal data processor 36. The system 10 also includes speech server 20 which is operable to query the web portal server 12 in response to voice inquiries from a telephone 24. The speech server includes call manager 22, computer telephone integration ("CTI") hardware 40, text to speech ("TTS") software 42, ASR software 44, and a NLU module 46. The call manager 22 acts as a control system for call sessions by managing resources and interacting with a user. In one example the call manager 22 asks for confirmation of a question if confidence is low (e.g. "Did you ask for the temperature in Toronto?").

Figure 3:
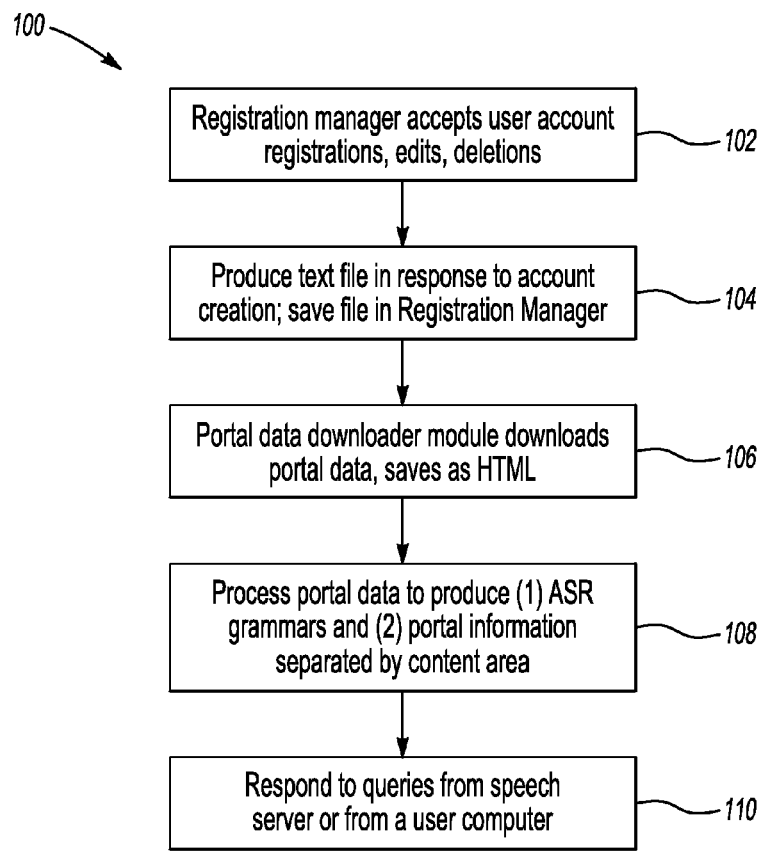
FIG. 3 schematically illustrates a method of providing information from a web portal.
Figure 4:
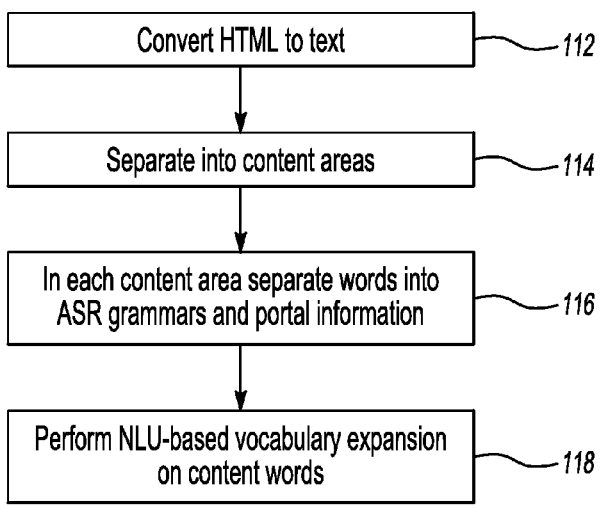
FIG. 4 schematically illustrates a method of filtering downloaded data to produce portal information.
Figure 5:
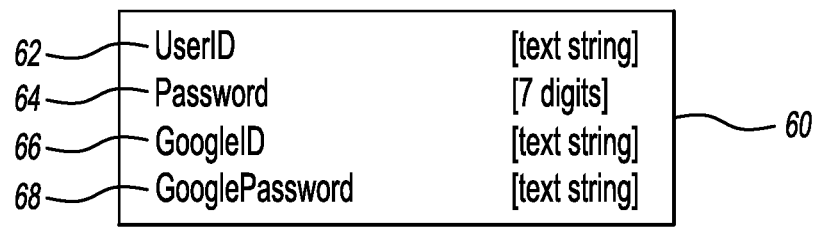
FIG. 5 schematically illustrates an example output of a registration manager of FIG. 2.

FIG. 3 schematically illustrates a method 100 of providing information from a web portal. The registration manager 30 is operable to create a user profile, to update a user profile, or to delete a user profile (step 102). In one example the registration manager 30 is a web application that runs in a web browser. In one example the registration manager 30 outputs and saves a text file (see FIG. 5) in response to the creation of a user profile (step 104). To create a user profile a user must provide a user ID 62 and password 64. If a user wishes to use a third party web portal 18b, the user must also provide a third party portal ID 66 and a third party portal password 68. Although FIG. 5 illustrates a Google ID and password, it is understood that other third party portals could be used.

The portal data downloader 32 is operable to download data according to parameters of the web portal 18 and to save the downloaded data as a hypertext markup language ("HTML") file (step 106) at a predefined time interval. In one example the time interval is one hour. However, it is understood that other time intervals could be used, and that other file formats could be used. In one example the portal data downloader 32 assigns to the HTML file a filename that includes a user ID and a password from the user profile (e.g. smith_1234567.html).

The user profile manager 34 is operable to verify usernames and passwords received via telephone 24 or computer 26. The user profile manager 34 is also operable to interact with a portal information database. In one example the profile manager 34 works in connection with the call manager 22 to verify a username. For example, the call manager 22 may use caller ID to identify a phone number and state "You are calling from (555) 555-5555, are you Mr. Smith?" and if a user affirmed that this was them the user would have a chance to speak or type in their password. Alternatively, if the phone number was not in the call manager 22 database then the user would have to enter in their username and their password.

Figure 6:
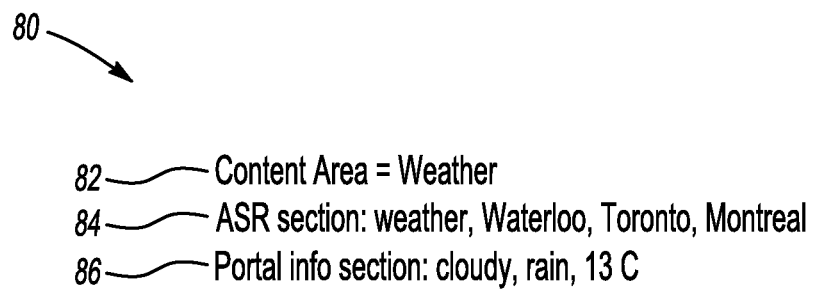
FIG. 6 schematically illustrates an example output of a portal data processor of FIG. 2.

The portal data processor 36 receives the HTML file and filters the data in the HTML file (see FIG. 6; step 108) by identifying content areas of the downloaded data, filtering the downloaded data into the content areas (step 114), and identifying automatic speech recognition ("ASR") grammars and portal information for each content area (step 116). In one example the ASR grammars are stored in a Nuance Grammar Specification Language ("GSL") format. As shown in the filtered data 80 of FIG. 6, one example content area 82 could be "weather." Example ASR grammars 84 could include "weather, Waterloo, Toronto, Montreal", and example portal information 86 associated with the weather content area 82 could include "cloudy, rain, 13 C, 55 F." In one example HTML tags are used to indicate content areas. In one example the portal data processor 36 converts the HTML file to a text file (step 112). In one example the portal information 86 is stored in a text file. In one example the portal information 86 is stored in the portal information database 38.

The portal data processor 36 is also operable to perform natural language understanding-based ("NLU") vocabulary expansion on content words based on, for example, hypernyms, synonyms, and symbol resources (step 118). For example, if a content word is "leukemia" then this may be expanded to include its hypernym "blood disease" so that a question such as "is there any news about blood diseases today?" could be answered. If a content word is "overcast" then a synonym such as "cloudy" could be added so that a question such as "is Montreal cloudy today?" could be answered. Company names could be translated to their stock ticker abbreviations (e.g. Microsoft=MSFT) so that a question such as "what is the value of Microsoft stock today?" could be answered.

The system 10 is therefore able to anticipate inquiries, as the ASR grammars 84 may be used to generate inquiries and the portal information 86 may be used to generate answers to those inquiries.

A database update protocol and data query protocol may be used to simplify interaction between components of the voice-enabled web portal system 10. The database update protocol is shared between the web portal server 12 and the speech server 20 and specifies data structures for mapping web content to databases on the speech server. This could simplify interactions between a database engineer and a web engineer so that the web engineer only has to convert web content to a format specified by the database update protocol, and the database engineer actually implements the code to perform database updates.

The data query protocol is shared by a database on the speech server 20 and the NLU module 46, and simplifies interactions between a speech application developer and a database engineer so that the speech application developer does not need to send queries, such as SQL queries, to specific database systems, and the database engineer would be responsible for interpreting NLU requests to search databases.

In one example the speech server 20 uses both NLU and phoneme-based garbage models to detect key concepts of spoken excerpts from telephone 24. The phoneme-based garbage model identifies keywords and ignores other words, permitting variations in a question. For example, if a user asked "Could you tell me the temperature tomorrow please?" the phoneme-based garbage model would identify words such as "weather," "temperature," "today," or "tomorrow" and would ignore other words. Thus, if a different user asked "I'd like to check the weather for today" or "How is the current temperature please?" the phoneme-based garbage model could identify the keywords in each and would not have to include every single word and all of their possible combinations, which can be difficult to model. The phoneme-based garbage model also accommodates accented speakers, such as non-native English speakers, by using fuzzy understanding rule matching to evaluate misrecognized words.

In one example, the voice-enabled web portal system 10 parses downloaded data into a personal section 48 for individual users and individual web portals 18, and a universal section 49 for all users and all web portals 18. For example, a weather application database (universal section) may contain weather data for all cities supported by the system 10 for all users, and a personal section may include only weather information for several cities. Use of the personal section 48 and universal section 49 facilitates effective database updates and maintenance.

A generic portal user modeling ASR grammar integrates with dynamic grammars generated by the portal data processor 36, and a generic portal user modeling dialog controller is used to interact with a user and to respond to simplified sentences (e.g. "check weather in Waterloo . . . how about in Toronto").

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A voice-enabled web portal system, comprising:
   a computer server on which is programmed a web portal server, the web portal server including a portal data processor receiving downloaded data and filtering the downloaded data into content areas and identifying automatic speech recognition ("ASR") grammars and portal information for each content area, wherein a user has a user profile that includes a profile username and a profile password and a third party portal username and a third party portal password for a third party web portal, wherein the third party web portal downloads data according to a defined set of parameters, and wherein the web portal server downloads data from the third art web portal; and
   a speech server comprising:
      a call manager software module operable to accept a voice query from a user via telephone, to retrieve a portion of the downloaded data in response to the voice query, and to provide the portion of downloaded data to the user via telephone; and
      a natural language understanding ("NLU") software module, wherein the speech server is operable to use the NLU software module to perform NLU-based vocabulary expansion and phoneme-based garbage model identification to interpret the voice query, wherein the NLU-based vocabulary expansion includes hypernyms, synonyms, or symbol resources, wherein the speech server resides on at least one computing device.

2. The system of claim 1, wherein the user has a user profile that includes parameters defining a desired data set, and wherein the web portal server downloads data according to the parameters.

3. The system of claim 1, wherein the web portal server includes a registration manager module operable to enable a user to create a user profile, to update the user profile, and to delete the user profile.

4. The system of claim 1, wherein the web portal server includes a portal data downloader module operable to download data according to a user profile at a predetermined time interval.

5. The system of claim 4, wherein the portal data downloader module saves the downloaded data in a file using a filename that includes a user ID and a password from the user profile.

6. The system of claim 5, wherein the file is a hypertext markup language, and wherein the portal data processor module converts the hypertext markup language file to a text file.

7. The system of claim 6, wherein the automatic speech recognition grammars are stored in a Nuance Grammar Specification Language format.

8. The system of claim 5, wherein the web portal server includes a user profile manager module that includes a portal information database that stores the portal information from the portal data processor module.

9. The system of claim 1, including a speech server containing the call manager software module and a computer telephone integration module, a text to speech software module, and an automatic speech recognition module.

10. The system of claim 1, wherein the web portal server is operable to transmit the downloaded data to a user computer in response to a query from the user computer.

11. The system of claim 1, including a universal section containing data for all web portals, and a plurality of personal sections each corresponding to an individual web portal.

12. The system of claim 1, wherein the web portal server and the call manager software module use a shared database update protocol, and wherein the call manager software module and the natural language understanding software module use a shared data query protocol.

13. A method of providing information from a web portal comprising:
    accessing a third party web portal using a third party portal username and a third party portal password of a user in a user profile;
    downloading data from the third party web portal onto a server, the data being downloaded via a web portal according to parameters of the web portal at a predetermined time interval;
    filtering the downloaded data to produce portal information, wherein said step of filtering the downloaded data to produce portal information includes identifying content areas of the downloaded data, filtering the downloaded data into the content areas, and identifying automatic speech recognition grammars for each content area, and identifying portal information for each content area;
    receiving a voice query;
    interpreting the voice query using a natural language understanding (NLU) software model, wherein a speech server is operable to use the NLU software module to perform NLU-based vocabulary expansion and a phoneme-based garbage model to detect the voice query and key concepts, wherein the NLU-based vocabulary expansion includes hypernyms, synonyms, and symbol resources;
    and
    selectively providing portions of the portal information in response to the voice query.

14. The method of claim 13, further comprising:
    saving the downloaded data in a file having a file name that includes a user ID and password from a user profile.

15. The method of claim 13, including performing a natural language vocabulary expansion on the content areas, the automatic speech recognition grammars, and the portal information.

16. The system of claim 1 wherein the web portal server is configured to access the third party web portal over the Internet using the third party portal username and the third party portal password, and to download the data from the third party web portal over the Internet.

17. A voice-enabled web portal system, comprising:
    a computer server on which is programmed a web portal server including a portal data downloader operable to download data via a web portal according to parameters of the web portal the web portal server further including a portal data processor receiving the downloaded data and filtering the downloaded data into content areas and identifying automatic speech recognition ("ASR") grammars and portal information for each content area; and
    a speech server comprising:
        a call manager software module operable to accept a voice query from a user via telephone, to retrieve a portion of the downloaded data in response to the voice query, and to provide the portion of downloaded data to the user via telephone; and
        wherein the speech server resides on at least one computing device,
        a natural language understanding ("NLU") software module, wherein the speech server is operable to use the NLU software module to perform NLU-based vocabulary expansion and phoneme-based garbage model identification to interpret the voice query,
    wherein the NLU-based vocabulary expansion includes hypernyms, synonyms, or symbol resources;
    wherein the user has a user profile that includes a profile username and a profile password and a third party portal username and a third party portal password for a third party web portal, wherein the third party web portal downloads data according to a defined set of parameters, and wherein the web portal server is configured to access the third party web portal over a wide-area network and to download data from the third party web portal over the wide-area network.

18. The system of claim 17 wherein the wide-area network is the Internet and wherein the web portal server accesses the third party web portal using the username and password.

19. The method of claim 13 wherein the downloaded data includes an html file and wherein the step of filtering the downloaded data into the content areas includes filtering the html file into the content areas.

* * * * *